United States Patent [19]

Demirörs

[11] Patent Number: 5,179,166
[45] Date of Patent: Jan. 12, 1993

[54] MONOVINYLIDENE AROMATIC POLYMERS WITH IMPROVED PROPERTIES AND A PROCESS FOR THEIR PREPARATION

[75] Inventor: Mehmet Demirörs, Terneuzen, Netherlands

[73] Assignee: The Dow Chemical Company, Midland, Mich.

[21] Appl. No.: 580,451

[22] Filed: Sep. 11, 1990

[30] Foreign Application Priority Data

Sep. 12, 1989 [GB] United Kingdom ............. 8920574

[51] Int. Cl.⁵ .................... C08L 25/04; C08L 25/16
[52] U.S. Cl. .................. 525/193; 525/241; 525/70; 525/71; 525/316
[58] Field of Search ............ 525/193, 241, 70, 71, 525/316

[56] References Cited

U.S. PATENT DOCUMENTS

| | | | |
|---|---|---|---|
| 2,727,884 | 12/1955 | McDonald et al. | 260/93.5 |
| 3,668,162 | 6/1972 | Wilt | 260/27 |
| 4,146,589 | 3/1979 | Dupre | 260/876 |
| 4,153,645 | 5/1979 | Lanza | 260/876 |
| 4,183,877 | 1/1980 | Ibaragi et al. | 525/70 |
| 4,214,056 | 7/1980 | Lavengood | 525/71 |
| 4,221,883 | 9/1980 | Mott et al. | 525/243 |
| 4,334,039 | 6/1982 | Dupre | 525/263 |
| 4,340,690 | 7/1982 | Lal et al. | 525/271 |
| 4,340,691 | 7/1982 | Lal et al. | 525/271 |
| 4,493,922 | 1/1985 | Echte et al. | 525/71 |
| 4,713,420 | 12/1987 | Henton | 525/236 |
| 4,785,051 | 11/1988 | Henton | 525/71 |

FOREIGN PATENT DOCUMENTS

| | | |
|---|---|---|
| 0015752 | 3/1980 | European Pat. Off. |
| 0048389 | 9/1981 | European Pat. Off. |
| 0096447 | 6/1983 | European Pat. Off. |
| 0152752 | 1/1984 | European Pat. Off. |
| 0158258 | 4/1985 | European Pat. Off. |
| 0277687 | 1/1988 | European Pat. Off. |
| 59-24711 | 2/1984 | Japan. |
| 8502192 | 11/1984 | World Int. Prop. O. |

OTHER PUBLICATIONS

Lenz, V. F, Wiss, Mikrokogie 63, pp. 50-60 Apr. 1955.
Schwartz, H.A., Metals and Alloys, Jun. 1934, p. 139.
Chemical Abstracts, 93:240501c Apr. 1980.

*Primary Examiner*—James J. Seidleck
*Assistant Examiner*—W. R. H. Clark

[57] ABSTRACT

There is disclosed a monovinylidene aromatic polymer resin having a specific rubber particle size distribution that provides surprisingly improved combinations of product properties, such as gloss, impact resistance and tensile strength. Such resin has a first group of smaller particles having a volume average particle diameter of from about 0.2 to about 0.6 micrometers and a second group of larger particles having a volume average particle diameter of from about 2.5 to about 5 micrometers. In these resins it is further necessary in this specific rubber particle size distribution, based on 100 parts by weight rubber or rubber equivalent, that (a) particles constituting from about 20 to about 60 parts by weight of the rubber have diameters of from about 0.1 to about 0.8 micrometers, (b) particles constituting from about 60 to about 20 parts by weight of the rubber have diameters of from about 2 to about 6 micrometers, and (c) that there be a specific amount of intermediate size particles constituting from about 10 to about 30 parts by weight of the rubber and having diameters between about 0.8 and about 2 micrometers. Also disclosed is a process for preparing such resins in a simplified production process wherein the rubber which is used has distinct high and low molecular weight components, the high molecular weight component having a weight average molecular weight at least about two and one half times greater than the weight average molecular weight of the low molecular weight component.

20 Claims, No Drawings

MONOVINYLIDENE AROMATIC POLYMERS WITH IMPROVED PROPERTIES AND A PROCESS FOR THEIR PREPARATION

This invention relates to rubber-reinforced monovinylidene aromatic polymer compositions of the type commonly referred to as "high impact polystyrene" or "HIPS". More particularly, the invention relates to such compositions in which the rubber-reinforcing particles have a specific broad particle size distribution and a process for their production.

Rubber-reinforced polymer compositions of the HIPS type are widely used in many applications because of their ease of molding, good gloss, and generally good mechanical properties. It has been known for some time that improved combinations of gloss and mechanical properties can be achieved in such rubber-reinforced polymers by providing a so-called "bimodal" distribution in the sizes of the rubber reinforcing particles, i.e. the particles show two distinct peaks in their size distribution. This is achieved by combining two or more such resins or components each having a group of rubber particles having a different average particle size. Various such monovinylidene aromatic polymer compositions are known having at least two groups of rubber particles wherein the groups have different average particle sizes. See for example U.S. Pat. Nos. 4,146,589: 4,214,056 and 4,334,039 and European Patents 0 096 447, 0 158 258 and 0 152 752 which disclose such compositions.

U.S. Pat. No. 4,493,922 also discloses such rubber-reinforced polystyrene compositions having bimodal rubber particle size distributions. The average rubber particle sizes disclosed for the groups of particles are 2 to 8 micrometers (especially from 5 to 6 micrometers) for the group of larger particles and 0.2 to 0.6 micrometers for the group of smaller particles.

As mentioned, a number of methods are proposed for achieving such a bimodal particle distribution. For example, U.S. Pat. No. 4,153,645 discloses a method for the preparation of a HIPS-type polymer in which two polymer compositions are prepared using standard production processes, the compositions having different average particle sizes. These two polymer compositions are then mixed by a subsequent mechanical blending process.

An alternative approach to producing HIPS polymers with a bimodal rubber distribution has been to introduce feed streams of monomer and rubber at two different points in the polymerization system. This results in a polymer product which generally has a fairly broad spread of rubber particle sizes. Examples of this are described in EP 0 015 752, U.S. Pat. No. 4,334,039 and EP 0 096 447. A disadvantage of such methods is that the mechanical properties of the resulting product can be somewhat poor and difficult to control.

Yet a further approach is disclosed in U.S. Pat. No. 4,146,589 and EP 0 048 389. In this method, two prepolymer compositions are prepared containing rubber particles with different particle sizes. The prepolymer compositions are then mixed and further polymerized to provide a polymer having a bimodal particle size distribution.

It has now been discovered that substantially improved rubber-reinforced monovinylidene aromatic polymer compositions can be achieved by employing a specific broad, generally bimodal rubber particle size distribution having two specified groups of particles and additionally having a specified amount of rubber particles with diameters in an intermediate range. Such a distribution, as further described below, provides a resin which can be used to produce articles having surprisingly improved combinations of tensile strength, impact resistance and surface gloss.

A continuous process has also been discovered whereby these products are advantageously prepared using standard production process equipment without the need for subsequent mechanical blending steps, supplying multiple rubber-containing feedstreams or combining multiple parallel process streams. According to this process a specific rubber material is used having high and low molecular weight components and the process conditions in standard production equipment are adjusted to produce the desired rubber particle size distribution.

In accordance with the present invention, there is provided a polymer composition comprising a monovinylidene aromatic polymer matrix having dispersed therein a first group of smaller particles having a volume average particle diameter of from about 0.1 to about 0.8 micrometers and a second group of larger particles having a volume average particle diameter of from about 2 to about 6 micrometers, characterized in that the rubber particle size distribution is such that, based on 100 parts by weight rubber or rubber equivalent: (a) particles constituting from 20 to about 60 parts by weight of the rubber have diameters of from about 0.1 to about 0.8 micrometers, (b) particles constituting from about 60 to about 20 parts by weight of the rubber have diameters of from about 2 to about 6 micrometers, and (c) particles constituting from about 10 to about 30 parts by weight of the rubber have diameters between about 0.8 and about 2 micrometers.

In accordance with the present invention there is also provided process for preparing a rubber-reinforced monovinylidene aromatic polymer comprising the steps of: (a) continuously supplying a reaction mixture comprising monovinylidene aromatic monomer and a dissolved rubber to a reactor means, (b) continuously polymerizing the monovinylidene aromatic monomer in the presence of the dissolved rubber in the reactor means under conditions whereby phase inversion subsequently occurs, (c) continuously removing from the reactor means a rubber-reinforced monovinylidene aromatic polymer, which process is characterized in that: (d) the rubber which is dissolved in the reaction mixture has distinct high and low molecular weight components, the high molecular weight component having a weight average molecular weight at least two and one half times greater than the weight average molecular weight of the low molecular weight component, (e) the process conditions prior to phase inversion are adjusted to produce different groups of rubber particles from the high and low molecular weight components of the rubber, each group having a different average rubber particle size.

The product of the present invention can be viewed as having a generally bimodal or broadened rubber particle size distribution with a critical amount of intermediate size particles along with the specified amounts of large and small rubber particles. This combination surprisingly results in a resin product which, in the form of molded articles, possesses improved combinations of impact resistance, tensile strength and surface gloss.

According to this invention it has surprisingly been discovered that products having a rubber particle size distribution of this type have better combinations of properties when, based on 100 parts by weight rubber or rubber equivalent, (a) particles constituting from about 20 to about 60 parts by weight of the rubber have diameters of from about 0.1 to about 0.8 micrometers, (b) particles constituting from about 60 to about 20 parts by weight of the rubber have diameters of from about 2 to about 6 micrometers, and (c) particles constituting from about 10 to about 30 parts by weight of the rubber have diameters between about 0.8 and about 2 micrometers. Preferably, particles constituting from about 30 to about 50 parts by weight of the rubber have diameters of from about 0.2 to about 0.7 micrometers, (b) particles constituting from about 50 to about 30 parts by weight of the rubber have diameters of from about about 2 to about 4 micrometers, and (c) particles constituting from about 15 to about 25 parts by weight of the rubber have diameters between about 1 and about 2 micrometers. Preferably, less than about 1 percent by weight of the rubber particles have a diameter larger than about 6 micrometers.

In terms of a bimodal distribution, it is found that as groups of particles, the group of smaller particles should have a volume average particle diameter of from about 0.2 to about 0.5 micrometers and the group of larger particles should have a volume average particle diameter of from about 2.5 to about 5 micrometers. Preferably the volume average particle diameter of the smaller particles should be from about 0.2 to about 0.5, more preferably from about 0.3 to about 0.5, and most preferably it is about 0.4 micrometers. Preferably the volume average particle diameter of the larger particles should be from 2.5 to about 4, more preferably from about 2.5 to about 3.5, and most preferably it is about 3 micrometers.

Within the other limitations specified above for the rubber particle distribution of the products according to this invention, the first group of smaller rubber particles (including any particles thereof having diameters in the intermediate size range) should generally comprise from about 30 about to about 60 weight percent of the total rubber content of the resin, preferably from about 40 to about 50 weight percent and most preferably less than about 50 weight percent.

As used herein, the said particle size is the diameter of the rubber particles as measured in the resultant product, including all occlusions of matrix polymer within rubber particles, which occlusions are generally present in the disperse rubber particles of a rubber-reinforced polymer prepared using mass polymerization techniques. Rubber particle morphologies, sizes and distributions may be determined using conventional techniques such as (for larger particles) using a Coulter Counter (Coulter Counter is a Trade Mark) or, particularly for smaller particles, transmission electron microscopy.

Regarding morphology of the rubber particles in the different groups, as is well known, the smaller particles typically have a core-shell (single, major occlusion) or cellular (multiple, minor occlusions) morphology. The larger particles would generally have a cellular or similar multiple-occlusion morphology.

The rubber-reinforced polymers of the present invention are derived from one or more monovinylidene aromatic compounds. Representative monovinylidene aromatic compounds include styrene; alkyl substituted styrenes such as alpha-alkyl-styrenes (e.g., alpha methyl styrene and alpha ethyl styrene) and ring alkylated styrenes and isomers thereof (e.g., ortho ethyl styrene, 2,4-dimethyl styrene and vinyltoluene, particularly, ortho or para vinyl toluene); ring substituted halo-styrenes such as chloro-styrene, 2,4-dichloro-styrene and the like: styrenes substituted with both a halo and alkyl group such as 2-chloro-4-methylstyrene; and vinyl anthracene. In general, the preferred monovinylidene aromatic monomers are styrene, alpha methyl styrene, one or more of the vinyl toluene isomers, and/or mixtures of two or more of these, with styrene being the most preferred monovinylidene aromatic compound.

The monomer mixture may optionally comprise minor amounts of one or more additional comonomers, preferably in an amount less than about 10 percent by weight of the polymerizable monomer mixture. Suitable comonomers are unsaturated nitriles, for example acrylonitrile; alkyl acrylates and alkyl methacrylates, for example methyl methacrylate or n-butylacrylate; ethylenically unsaturated carboxylic acid monomers; and ethylenically unsaturated carboxylic acid derivative monomers including anhydrides and imides such as maleic anhydride and N-phenyl maleimide. It is preferred, however, for the practice of the present invention to use either less than about 10 percent by weight of n-butylacrylate or substantially no other copolymerizable monomer. The specified particle size distribution is no longer optimal for larger amounts of one or more of these monomers.

Regarding the rubber materials suitable for use according to the present invention, the essential requirement for the rubber material is that it has a relatively high molecular weight component and a relatively low molecular weight component. Suitable rubbers for use herein are the partially coupled rubbers, also called radial or star rubbers, which are preferred, and blends of rubbers meeting the requirements for rubber materials to be employed in this invention. The molecules of these rubber materials have three or more polymer segments coupled by a single polyfunctional element or compound. Radial or star polymers having this designed branching are conventionally prepared using a polyfunctional coupling agent. Methods for preparing star or radial polymers having designed branching are well-known in the art. Methods for preparing a polymer of butadiene of this type using a coupling agent are illustrated in U.S. Pat. Nos. 4,183,877, 4,340,690, 4,340,691 and 3,668,162 and Japanese Patent 59-24 711.

Radial or star polymers, and preferably those where the "arm" segments have been partially coupled with tin-based, silicon-based or polyfunctional organic coupling agents, are most preferably employed in the practice of the present invention. The cis content of the star or radial rubbers will advantageously be less than or equal to about 70 percent, preferably less than or equal to about 55 percent and most preferably less than or equal to about 50 percent as determined by conventional IR spectrometry techniques.

Due to incomplete branching, these radial-type polymers have components of relatively high and relatively low molecular weight polymer and, for this reason, typically exhibit two or more molecular weight peaks when molecular weight is plotted on the x-axis against weight percent of the rubber material on the y-axis (i.e., a bimodal molecular weight distribution). As would be expected, one molecular weight peak (the lower molecular weight component) indicates the molecular weight of the uncoupled segments and a second molecular weight peak (the higher molecular weight component) indicates the molecular weight of the coupled or branched polymer.

As used herein, the molecular weights referred to are the weight average molecular weights or Mw's for the rubber components as determined by the gel permeation chromatographic techniques described by ASTM Test Method designated D-3536 (polystyrene standard) and expressed without correction for the differences between rubber and polystyrene standards.

The radial polymers suitable for use according to the present invention advantageously exhibit a low molecular weight component Mw of at least about 100,000, more preferably at least about 130,000, most preferably at least about 150,000. The ratio of the Mw of the high molecular weight component to the Mw of the lower molecular weight component indicates the degree of coupling. In general, such ratio should be least about 2.5, advantageously from about 3 to about 6, preferably from about 3 to about 5, and most preferably from about 3 to about 4. In other words, for the coupled rubber molecules, it is desired that there is an average of about 3 or about 4 "arms" per molecule.

In addition, in order to obtain the proper proportions of the small and large rubber particles, it is preferred if the low molecular weight component of the rubber material constitutes from about 30 to about 60 weight percent of the total rubber content of the resin, preferably from about 40 to about 50 weight percent and most preferably less than about 50 weight percent. Most preferably neither component is more than about 70 percent larger than the other.

The rubbers preferably employed in the practice of the present invention are those polymers and copolymers which exhibit a second order transition temperature which is not higher than about 0° C., preferably not higher than about −20° C. and more preferably not higher than about −40° C. as determined or approximated using conventional techniques, e.g., ASTM Test Method D-746-52 T.

Highly preferred rubbers are alkadiene polymers. Suitable alkadienes are 1,3-conjugated dienes such as butadiene, isoprene, chloroprene or piperylene. Most preferred are homopolymers (excepting any coupling monomers) prepared from 1,3-conjugated dienes, with such homopolymers of 1,3-butadiene being especially preferred. Alkadiene copolymer rubbers containing small amounts, for example less than 15, preferably less than 10 weight percent, of other monomers such as monovinylidene aromatics can also be employed if the rubbers meet the other qualifications described herein. The most preferred rubbers are the radial or star homopolymers of 1,3-butadiene which have a cis content of from about 45 to about 70 percent and a high molecular component Mw of from about 400,000 to about 800,000. An example of this type of rubber is Asaprene 760 A(TM), commercially available from Asahi Chemical Company.

Preferably the rubber material has a relatively high average molecular weight and a relatively low solution viscosity and Mooney viscosity. In general, the solution viscosity for the rubbery materials will be desirably below about 90 cps while the Mooney viscosity will be less than about 60 cps. As known by those skilled in the art, various techniques such as control of the branching and molecular weight control can be used to adjust and tailor these polymers to achieve the optimum solution and Mooney viscosities. The solution viscosity of a radial-type alkadiene polymer will generally be less than a linear polymer or copolymer of the same monomeric components and same molecular weights.

Advantageously, to prepare a rubber-reinforced resin using mass or mass/suspension polymerization techniques, the solution viscosity of the rubber of the radial-type alkadiene polymer, as measured as a 5 weight percent solution in styrene, will be less than or equal to about 90, more advantageously less than or equal to about 85, most advantageously less than or equal to about 80, centipoise (cps) at 25° C. when the viscosity is measured using a Canon-Fenske capillary viscometer (Capillary No. 400, 1.92 mm inside diameter). The minimum solution viscosity of the rubber is not particularly critical to the practice of the invention. In a preferred range the solution viscosity of the rubber is at least 65 and most preferably at least about 70 centipoise.

The Mooney viscosity values of the radial-type rubbers should be less than about 65, preferably less than about 60 as measured by DIN 53523. In general, to have a rubber which is sufficiently solid to be handled and processed in a normal fashion, the Mooney viscosity value should be at least about 30 and values of at least about 40 are preferred. The preferred range for the Mooney value is between about 20 and about 70, more preferably between about 30 and about 65, most preferably between about 40 and about 60.

Although the rubber may contain a small amount of a crosslinking agent, excessive crosslinking can result in loss of the rubbery characteristics and/or render the rubber insoluble in the monomer.

The rubber is advantageously employed in amounts such that the rubber-reinforced polymer product contains from about 2 to about 20 percent, preferably from about 3 to about 17 percent, more preferably about 3 to about 15 weight percent rubber or rubber equivalent.

The term "rubber" or "rubber equivalent" as used herein to indicate weight amounts of rubber material is intended to mean, for a rubber homopolymer (such as polybutadiene), simply the amount of rubber, and for a block copolymer, the amount of the copolymer made up from monomer(s) which, when homopolymerized form a rubbery polymer. For example, for calculating the amount of rubber in a composition where a butadiene-styrene block copolymer rubber has been employed, the "rubber" or "rubber equivalent" of the composition is calculated based on only the butadiene component in the block copolymer. Obviously where physical properties or other aspects of the rubber material are measured, the complete rubber material including any comonomers is referred to.

The process of the present invention is characterized by the utilization of a rubber having specific high and low molecular weight components under process conditions whereby the above-specified rubber particle size distribution can be obtained with standard polymerization processes and equipment.

In the preparation of the rubber-reinforced polymers, a reaction mixture is prepared by dissolving the rubber in the monomer(s) and the resulting monomer/rubber solution, referred to herein as the reaction mixture, is supplied to a reactor means and subsequently polymerized. The amount rubber initially dissolved in the reaction mixture is dependent on the desired concentration of rubber in the final rubber-reinforced polymer product, the degree of conversion during polymerization and the viscosity of the reaction mixture solution. Specifically, the viscosity of the reaction mixture solution is advantageously less than about 3000 centipoise. At higher viscosities, the reaction mixture solution is difficult to process. Provided the viscosity of the reaction mixture is not undesirably high, the reaction mixture solution will generally comprise from about 5 to about 15, weight percent of the rubber, said weight percent being based on the total amounts of rubber and monomers employed.

Optionally, the reaction mixture will contain an organic liquid diluent. Organic liquid diluents suitably employed are normally liquid organic materials which do not boil at the polymerization conditions employed and which form a solution with the polymerizable monomer(s) and the polymer prepared therefrom. Representative organic liquid diluents include aromatic (and inertly substituted aromatic) hydrocarbons such as toluene, benzene, ethylbenzene and xylene; saturated or inertly substituted, saturated aliphatics having either straight or branched chains of five or more carbon atoms such as heptane, hexane and octane; alicyclic or inertly substituted alicyclic hydrocarbons having five or six carbon atoms such as cyclohexane. Preferred of such organic liquid diluents are the inertly substituted aromatics, with ethylbenzene and xylene being most preferred. In general, the organic liquid is employed in amounts sufficient to improve the processability and heat transfer during polymerization, e.g., flow characteristics of the polymerization mixture. Such amounts will vary depending on the rubber, monomer and diluent employed, the process equipment and the desired degree of polymerization. In general, if employed, the reaction mixture will normally contain from about 2 to about 30 weight percent of the diluent based on the total weight of the rubber, monomer and diluent.

During the polymerization of the resulting reaction mixture, the polymerization conditions are maintained such that phase inversion subsequently occurs. Under such conditions the monomer is polymerized both with the rubber (grafted) and separately (free polymer), which dissolved rubber thereby becomes grafted with a portion of polymerized monomer. The balance of free polymer, basically incompatible with the rubber, forms a discontinuous smaller volume polymer/monomer phase dispersed throughout the larger volume continuous phase of the monomer/rubber (including grafted rubber) solution.

Eventually, at a point after sufficient amounts of free polymer are formed, the free polymer converts from a discontinuous phase dispersed in the continuous phase of the unpolymerized monomer(s), through a point where there is no distinct continuous or discontinuous phases in the polymerization mixture, to a continuous polymer phase having the rubber dispersed as discrete particles there through. As the polymer/monomer phase becomes the larger volume phase and hence the continuous phase, the grafted rubber forms a discontinuous phase. This is the point in the polymerization when phase inversion occurs and the rubber becomes dispersed in the form of particles through the continuous polymer phase resulting in a product having rubber particles dispersed in a matrix of monovinylidene aromatic polymer.

Preferably, at phase inversion, the rubber is sufficiently grafted such that the disperse rubber particles, following initial sizing, are capable of retaining essentially the same average particle size and morphological properties throughout the remainder of the polymerization process.

It is of critical importance in the practice of the present invention to operate the polymerization process at conditions such that at the point of phase inversion, the high and low molecular weight components of the rubber form separate groups of rubber particles having different average particle sizes. Prior to the time of this invention, rubber materials of the general type utilized herein have been employed in mass processes for the preparation of monovinylidene aromatic polymers but have not resulted in the necessary rubber particle size distributions. See for example EP 277 687.

The polymerization process features that are utilized to achieve the requisite rubber particle distribution and therefore require special attention include the use of a graft promoting chemical initiator, such as 1,1-ditertiary butyl peroxycyclohexane. With such an initiator the grafting onto the high molecular weight component of the rubber is promoted and multiple grafts are formed. This stabilizes these rubber molecules in the reaction mixture and facilitates the separation of the high molecular weight rubber molecules from the lower molecular weight rubber. This contributes to the formation of the larger rubber particles.

The lower molecular weight component of the rubber, on the other hand, being less grafted, tends to form the smaller particles somewhat later than the larger particles are formed. It is also desirable to facilitate the formation of separate, smaller particles to provide an increased amount of agitation to the reaction mixture during and well after the point of phase inversion. Phase inversion has usually taken place at a point in the polymerization process where the reaction mixture contains a solids level which, in weight percent based on reaction mixture, is about 2.5 or about 3 times the weight content of the added rubber material. Therefore, a relatively high agitation level is preferably maintained until a point in the polymerization process where the reaction mixture contains a solids level which, in weight percent based on reaction mixture, is at least about 3, preferably about 4 times the weight content of the added rubber material.

For example, when there is about 5 to about 10 weight percent rubber added to the reaction mixture, relatively high agitation is maintained until the reaction mixture contains about 30 percent by weight solids. As used herein, the term solids refers to the polymeric components of the reaction mixture such as the rubber which was added initially and the monovinylidene aromatic polymer which has been formed.

Depending upon particular production equipment there may also be other process features that can be utilized to further facilitate the formation of the specified rubber particle size distribution.

In general, continuous methods are employed for mass polymerizing the monovinylidene aromatic compound in the reaction mixture. In the practice of the present invention it is generally preferred to utilize a stratified, linear flow, stirred tower type reactor, also referred to as a plug flow type reactor. Such reactors are well known. See, for example U.S. Pat. No. 2,727,884. Such a process may or may not comprise recirculation of a portion of the partially polymerized product. It has been determined that their utilization to prepare the product according to the present invention in a process of the kind described can provide very substantial improvements in the production process and in the mechanical properties of the product, and in particular in product impact resistance.

An important aspect of such polymerization processes is that a significant portion of the polymerization of the monovinylidene aromatic monomer in the reaction mixture can take place in the presence of the dissolved rubber. Phase inversion and precipitation and dispersion of the rubber particles does not occur until after sufficient grafting of monovinylidene aromatic polymer onto the rubber, which primarily takes place when the rubber is in solution.

This is a major advantage over polymerization in completely mixed, stirred tank type reactors (non-stratified, non-plug flow) which are operated at a predetermined level of conversion. Typically, due to the presence of significant levels of the already polymerized monovinylidene aromatic polymer, the rubber which may be dissolved in the feed stream to such a reactor, is immediately dispersed as particles before graft polymerization can occur and, more importantly, before the high and low molecular weight components of an appropriate rubber material can separate and form separate groups of rubber particles.

Moreover, the process according to the present invention can be practiced advantageously on standard mass polymerization process equipment not otherwise capable of the preparation of monovinylidene aromatic polymers with bimodal rubber particle distributions without significant equipment modifications. Such standard equipment typically utilizes a single supply of the unpolymerized reaction mixture comprising a solution of rubber, monomer, optional diluent and other additives. The reaction mixture is then polymerized as it proceeds through one or a series of such reactor vessels. At the end of the reactor vessel (series) the product is removed and diluent and any residual monomer removed.

It is expensive and otherwise difficult to adapt such equipment or add sufficient additional equipment to permit production of a bimodal product by known techniques. Such modifications would otherwise require: (a) means for supplying the same or different rubber-containing reaction mixtures to at least one more addition point in the reactor vessel (series), which process becomes difficult to control, (b) addition of parallel polymerization equipment and combination of its output into the existing process, which is expensive and also results in a process that is difficult to control or (c) acquiring blending equipment to permit mechanical blending of separately prepared polymers.

In the process according to this invention, improved polymer compositions can be prepared in a standard mass process having only a single supply of the rubber-containing reaction mixture to the reactor means.

A suitable graft promoting initiator may be employed in the preparation of the rubber-reinforced polymer. Representative of such initiators include the peroxide initiators such as the peresters, e.g., tertiary butyl peroxybenzoate, tertiary butyl peroxyacetate, dibenzoyl peroxide, and dilauroyl peroxide, the perketals, e.g., 1,1-bis tertiary butyl peroxycyclohexane, 1,1-bis tertiary butyl peroxy-3,3,5-trimethyl cyclohexane, and di-cumyl peroxide, and the percarbonates; photo chemical initiation techniques; and the like. Preferred initiators include tertiary butyl peroxy benzoate, 1,1-bis tertiary butyl peroxy cyclohexane 1,1-bis tertiary butyl peroxy-3,3,5 trimethyl cyclohexane and tertiary butyl peroxy acetate.

Initiators may be employed in a range of concentrations dependent on a variety of factors including the specific initiator employed, the desired levels of polymer grafting and the conditions at which the mass polymerization is conducted. Specifically, in the preferred mass polymerization process for preparing rubber-reinforced polymers, from about 50 to about 2000, preferably from about 100 to about 1500, weight parts of the initiator are employed per million weight parts of monomer.

The polymerization mixture used in the preparation of both the smaller and larger particles may also contain other additive materials and/or polymerization aids such as plasticizers or lubricants such as mineral oil, butyl stearate or dioctyl phthalate; stabilizers including antioxidants (e.g., alkylated phenols such as di-tert-butyl-p-cresol or phosphites such as trisnonyl phenyl phosphite); chain transfer agent, such as an alkyl mercaptan such as n-dodecyl mercaptan; or mold release agents, e.g., zinc stearate; all of which additives and/or polymerization aids are added to the reaction mixture where appropriate including before, during or after polymerization.

The use of a chain transfer agent is optional and is usually employed only in the production of a composition or prepolymer containing larger size rubber particles (e.g. having an average particle size of at least one micrometer). If employed, the chain transfer agent is generally employed in an amount of from about 0.001 to about 0.5 weight percent based on the total weight of the polymerization mixture to which it is added.

The temperatures at which polymerization is most advantageously conducted are dependent on the specific components, particularly initiator, employed but will generally vary from about 60° to about 190° C.

Crosslinking of the rubber in the resulting product and removal of the unreacted monomers, as well as any reaction diluent, if employed, and other volatile materials is advantageously conducted employing conventional techniques.

The following Experiments are set forth to illustrate the present invention and should not be construed to limit its scope. In the examples, all parts and percentages are by weight and all temperatures are degrees Celsius unless otherwise indicated. The rubber materials used in the following experiments are summarized in Table I below. The abbreviations used in the Tables include Mw (weight average molecular weight, Mw Ratio (ratio of Mw of the high molecular component of the rubber material to the Mw of the low molecular weight component of the rubber material) and Wt % (weight percent).

TABLE I

| Type | R-1 Partially Coupled[1] | R-2 Linear[3] | R-3 Coupled[3] | R-4 Linear[2] |
|---|---|---|---|---|
| Solution Viscosity | 80 | 15 | 260 | 170 |
| Mooney Viscosity | 55 | <5 | 75 | 55 |
| Mw (Overall) | 520,000 | 150,000 | 500,000 | 450,000 |
| Lower Mw Component | | | | |
| Mw | 150,000 | 150,000 | 150,000 | — |
| Wt % | 50 | 100 | <10 | — |
| Higher Mw Component | | | | |
| Mw | 600,000 | — | 500,000 | — |
| Wt % | 50 | — | >90 | — |

TABLE I-continued

| Type | R-1 Partially Coupled[1] | R-2 Linear[3] | R-3 Coupled[3] | R-4 Linear[2] |
|---|---|---|---|---|
| Mw Ratio | 4 | — | — | |

[1] Commercially available as Asaprene 760A from Asahi Chemical Company. Asaprene is a trademark of Asahi Chemical Company.
[2] Commercially available as HX 529C from Bayer GmbH.
[3] Experimental composition.

In the following Experiments further summarized in Tables II and II-A a reaction mixture is prepared containing 7 parts by weight rubber of the type indicated, 6 parts by weight ethylbenzene, 0.08 parts by weight Irganox 1076 brand hindered phenol antioxidant, 0.5 parts by weight mineral oil, and 86.42 parts by weight styrene. As shown, 1,1-bis-ditertiarybutyl peroxychclohexane initiator and chain transfer agent (n-dodecyl mercaptan, "n-DM") were used in the indicated amounts in some Experiments. Where used, the chain transfer agent and initiator were added to the reaction mixture supplied to the reactor.

The reaction mixture was supplied to the reactor at a rate of 1000 weight parts per hour, the reactor having the temperature profile as indicated.

As summarized below, samples were prepared in a polymerization process where this reaction mixture is supplied to a reactor operated under the indicated conditions. For Experiments 1*, 2 and 3* the reactor was a continuous agitated plug-flow type reactor system. The indicated components were supplied to the initial reactor zone and the polymerization reaction occurred while the materials proceeded through a series of three reactor zones. As the reaction mixture proceeds through the system the temperature increases from the indicated beginning temperature to about 175° C. when the mixture is removed from the reactor.

For Experiment 4* a batch reactor was used under conditions such that this agitated plug-flow type reactor system was simulated with indicated temperature and agitation profile.

The conditions in the reactors zones are controlled during the polymerization reaction, for example by temperature control, agitation levels, use of additives in the feed, etc., such that phase inversion and particle sizing has occurred at a solids level of about 20 weight percent. This point is about one third of the distance through the plug-flow reactor system or one third the residence time for the batch reactor. It is believed that the particle size of the rubber particles then remains essentially constant after phase inversion and during further polymerization.

During the polymerization process of Experiment 1*, the shearing agitation was adjusted as necessary to obtain proper heat transfer and size the rubber particles to a uniform and appropriate size for products of this type and these levels were observed. This is obviously dependent on the exact reactor and agitation geometry and needs to be experimentally established for any specific polymerization apparatus.

As shown in the Table in the entry for "Agitation", in subsequent polymerization runs, relatively higher shear (via an increase of about 50 percent in the agitation rate) was applied in the initial polymerization stages, through the point of phase inversion and up to the point where the solids level was about 30 weight percent in the reaction mixture. The shear level in the later polymerization stages, where reaction mixture solids levels were more than 30 weight percent, remained at the same level for all polymerization runs.

As shown in the following Table II-A, two parallel reactors were used to prepare a bimodal rubber particle distribution in a HIPS polymer resin that was otherwise the same as those described in Table II. The process summarized in Table II-A was generally the same as used in Experiments 1* through 3* with the exception that the reaction mixtures indicated were supplied to first and second continuous plug flow reactors (Reactors 1 and 2) which were operated independently in parallel. They were operated to obtain the indicated solids levels wherein the reaction mixtures had passed the point of phase inversion and their outputs were both provided to Reactor 3 where the polymerization process was completed. The resulting product is also described in Table III.

The average residence time of the reaction mixtures was approximately 8 hours. At the completion of the polymerization processes, the solids levels of the reaction mixtures were about 80 to 85 percent by weight.

The reaction mixtures removed from the last zone were heated to 220° to 240° C. to remove any remaining volatiles and assist in crosslinking the rubber.

The average rubber particle size (volume average) and the rubber particle size distribution were determined by transmission electron photomicrography (TEM) (F. Lenz, A. F. Wiss Mikroskopie 63 (1956), pages 50/56) in micrometers. The data were treated using a Schwartz correction, resulting in a calculation of volume average and number average rubber particle size (H. A. Schwartz, Metals and Alloys, June 1934, page 139). The rubber particle morphology was observed to be core-shell for the groups of smaller particles and cellular for the groups of larger particle.

For these and subsequent experiments the following test methods were used. Izod impact resistance (IZOD) was measured according to ASTM D256 and is given in Joules per meter (J/m). Tensile strength at yield (TSY) was measured according to ASTM D 638 and is given in megaPascals (MPa). To prepare the Izod and tensile test specimens, the rubber-reinforced polymers were injected at an injection pressure which is experimentally determined for each sample by making moldings under increased pressures until a flash molding (excess polymer for mold) appeared and then the pressure was reduced to a pressure such that no excess material (flash molding) appeared.

The 60° Gardner gloss was measured on plaques (3×50×120 millimeters) using a Dr. Lange reflectometer against a reference supplied with the apparatus. The plaques were injection molded on an Arburg All-Rounder injection molding apparatus with a melt temperature of 230° C. and a mold temperature of 30° C.

Regarding the RPS DISTRIBUTION information given in Table III, it is there indicated the weight percentage rubber having particle diameters in the specified ranges and, for Experiment No. 5, the fact that the products of Experiment Nos. 3 and 4 were blended to prepare the composition.

The abbreviations used in the following Tables include Wt (weight parts) and RPS (volume average rubber particle size in micrometers). For the volume average rubber particle sizes measured, the particles in the intermediate size range (if any) were included in the appropriate group of larger or smaller particles.

TABLE II

| | Experiment No. | | | |
|---|---|---|---|---|
| | 1* | 2 | 3* | 4* |
| REACTION MIXTURE | | | | |
| Rubber type | R1 | R1 | R2 | R3 |
| Initiator (Wt) | — | 0.02 | 0.02 | 0.02 |
| REACTION CONDITIONS | | | | |
| Temp (°C.) (Enter) | 125 | 110 | 110 | 110 |
| (Exit) | 175 | 175 | 175 | 175 |
| Initial Stage Agitation | Standard | +50% | +50% | +50% |

*Comparative Experiment, not an example of this invention.

TABLE II-A

| | Experiment No. 6* |
|---|---|
| Reaction Mixture | |
| Reactor 1 | |
| Rubber type | R4 |
| Initiator (Wt) | 0.01 |
| Reactor 2 | |
| Rubber type | R4 |
| Initiator (Wt) | 0.01 |
| n-DM Chain transfer agent (Wt) | 0.02 |
| REACTION CONDITIONS | |
| Reactor 1; Smaller Particles | |
| Feed Rate (Wt/hr) | 750 |
| Temperature (°C.) | |
| Enter | 115 |
| Exit | 122 |
| Solids (Wt %) | 30 |
| Agitation | +50 |
| Reactor 2: Larger Particles | |
| Feed rate (Wt/hr) | 250 |
| Temperature (°C.) | |
| Enter | 105 |
| Exit | 117 |
| Solids (Wt %) | 30 |
| Agitation | +50% |
| Reactor 3 | |
| Feed rate (Wt/hr) | 1000 |
| Temperature (°C.) | |
| Enter | 125 |
| Exit | 175 |
| Agitation | Standard |

*Comparative Experiment, not an example of this invention.

TABLE III

| | Experiment No. | | | | | |
|---|---|---|---|---|---|---|
| | 1* | 2 | 3* | 4* | 5 | 6* |
| RPS (small) | — | 0.4 | 0.3 | — | 0.4 | 0.5 |
| RPS (large) | ±4 | 3 | — | 4 | 4 | 4 |
| RPS DISTRIBUTION | | | | | | |
| 0.1 to 0.8 | 9 | 40 | 100 | 15 | 58 | 70 |
| 0.8 to 2 | 20 | 20 | — | 30 | 15 | 5 |
| 2 to 6 | 71 | 40 | — | 55 | 27 | 25 |
| Components | — | — | — | — | 3 & 4 | — |
| PRODUCT PROPERTIES | | | | | | |
| Total Rubber (Wt %) | 8.5 | 8.5 | 8.5 | 8.5 | 8.5 | 8.5 |
| Izod (J/m) | 119 | 145 | 20 | 105 | 90 | 119 |
| TSY (MPa) | 22 | 27 | 30 | 21 | 26 | 24 |
| Gloss (%) | 50 | 88 | 100 | 50 | 70 | 70 |

*Comparative Experiment, not an example of this invention.

What is claimed is:

1. A process for preparing a rubber-reinforced monovinylidene aromatic polymer comprising the steps of:
   (a) continuously supplying a reaction mixture comprising monovinylidene aromatic monomer and a dissolved rubber to a reactor means,
   (b) continuously polymerizing the monovinylidene aromatic monomer in the presence of the dissolved rubber in the reactor means under conditions whereby phase inversion subsequently occurs,
   (c) continuously removing from the reactor means a rubber-reinforced monovinylidene aromatic polymer, which process is characterized in that:
   (d) the rubber which is dissolved in the reaction mixture has distinct high and low molecular weight components, the high molecular weight component having a weight average molecular weight at least two and one half times greater than the weight average molecular weight of the low molecular weight component, and
   (e) the process conditions prior to phase inversion are adjusted to produce different groups of rubber particles from the high and low molecular weight components of the rubber, each group having a different average rubber particle size such that the product rubber-reinforced monovinylidene aromatic polymer has dispersed therein a first group of smaller particles having a volume average particle diameter of from about 0.2 to about 0.6 micrometers and a second group of larger particles having a volume average particle diameter of from about 2.5 to about 5 micrometers, and the rubber particle size distribution is such that, based on 100 parts by weight rubber or rubber equivalent:
   (i) particles constituting from about 20 to about 60 parts by weight of the rubber have diameters of from about 0.1 to about 0.8 micrometers,
   (ii) particles constituting from about 60 to about 20 parts by weight of the rubber have diameters of from about 2 to about 6 micrometers, and
   (iii) particles constituting from about 10 to about 30 parts by weight of the rubber have diameters between greater than about 0.8 and less than about 2 micrometers.

2. A process according to claim 1 wherein a graft-promoting initiator is employed.

3. A process according to claim 2 wherein the graft-promoting initiator is selected from the group of the peresters, the perketals, and the percarbonates.

4. A process according to claim 3 wherein the graft-promoting initiator is selected from the group consisting of tertiary butyl peroxy benzoate, 1,1-bis tertiary butyl peroxy cyclohexane 1,1-bis tertiary butyl peroxy-3,3,5 trimethyl cyclohexane and tertiary butyl peroxy acetate.

5. A process according to claim 4 wherein from about 50 to about 2000 weight parts of the initiator are employed per million weight parts of monovinylidene aromatic monomer.

6. A process according to claim 1 wherein the rubber of step (d) comprises at least one star or radial polymer.

7. A process according to claim 1 wherein the weight average molecular weight of the high molecular weight component of the rubber of step (d) is from about 3 to about 6 times higher than the weight average molecular weight of the low molecular weight component of said rubber.

8. A process according to claim 1 wherein the weight average molecular weight of the high molecular weight component of the rubber of step (d) is from about 3 to about 5 times higher than the weight average molecular weight of the low molecular weight component of said rubber.

9. A process according to claim 1 wherein the weight average molecular weight of the high molecular weight component of the rubber of step (d) is from about 3 to about 4 times higher than the weight average molecular weight of the low molecular weight component of said rubber.

10. A process of claim 6 wherein the rubber of step (d) is a star or radial polymer.

11. The process of claim 10 wherein the cis content of the rubber is less than or equal to about 70%.

12. The process of claim 11 wherein the cis content of the rubber is less than or equal to about 55%.

13. The process of claim 11 wherein the cis content of the rubber is less than or equal to about 50%.

14. The process of claim 1 wherein less than about 1% by weight of the rubber particles have a diameter larger than about 6 micrometers.

15. The process of claim 1 wherein the first group of smaller particles has a volume average particle diameter of from about 0.3 to about 0.5 micrometers and the second group of larger particles has a volume average particle diameter of from about 2.5 to about 3.5 micrometers.

16. The process of claim 1 wherein, based on 100 parts by eight rubber or rubber equivalent: (a) particles constituting from about 30 to about 50 parts by weight of the rubber have diameters of from about 0.2 to about 0.7 micrometers, (b) particles constituting from about 50 to from about 30 parts by weight of the rubber have diameters of from about 2 to about 4 micrometers, and (c) particles constituting from about 15 to about 25 parts by weight of the rubber have diameters between 1 and 2 micrometers.

17. The process of claim 1 wherein the rubber content is from about 2 to about 20 weight percent.

18. The process of claim 1 wherein the second order transition temperature of the rubber is not higher than about 0° C.

19. The process of claim 18 wherein the second order transition temperature of the rubber is not higher than about −20° C.

20. The process of claim 18 wherein the second order transition temperature of the rubber is not higher than about −40° C.

* * * * *